US010964289B2

(12) United States Patent
Bai et al.

(10) Patent No.: US 10,964,289 B2
(45) Date of Patent: Mar. 30, 2021

(54) OLED DISPLAY WITH DIFFERENT SPATIAL GAMMA

(71) Applicant: Google LLC, Mountain View, CA (US)

(72) Inventors: Xiaoping Bai, Pleasanton, CA (US); Sang Young Youn, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/522,601

(22) Filed: Jul. 25, 2019

(65) Prior Publication Data

US 2021/0027745 A1 Jan. 28, 2021

(51) Int. Cl.

| | |
|---|---|
| ***G06T 11/00*** | (2006.01) |
| ***G06T 5/00*** | (2006.01) |
| ***G09G 5/10*** | (2006.01) |
| ***G09G 3/3275*** | (2016.01) |
| ***G09G 5/14*** | (2006.01) |
| ***G09G 3/20*** | (2006.01) |

(52) U.S. Cl.

CPC ............ *G09G 5/10* (2013.01); *G09G 3/2096* (2013.01); *G09G 3/3275* (2013.01); *G09G 5/14* (2013.01); *G09G 2310/0297* (2013.01); *G09G 2310/08* (2013.01); *G09G 2320/0673* (2013.01); *G09G 2320/0686* (2013.01); *G09G 2360/14* (2013.01)

(58) Field of Classification Search

CPC combination set(s) only.
See application file for complete search history.

(56) References Cited

U.S. PATENT DOCUMENTS

| | | | |
|---|---|---|---|
| 10,068,551 B1 | 9/2018 | Choi et al. | |
| 2010/0182332 A1 | 7/2010 | Ozawa et al. | |
| 2011/0014955 A1 | 1/2011 | Kim et al. | |
| 2016/0358346 A1 | 12/2016 | Hendry et al. | |
| 2018/0330674 A1* | 11/2018 | Baar | G06T 5/009 |
| 2019/0058855 A1 | 2/2019 | Uchimura et al. | |
| 2019/0197964 A1* | 6/2019 | Cho | G09G 3/20 |
| 2020/0152134 A1* | 5/2020 | Lee | G09G 3/2074 |

FOREIGN PATENT DOCUMENTS

| | | |
|---|---|---|
| WO | WO 2018/008297 | 1/2018 |
| WO | WO 2018/066482 | 4/2018 |

OTHER PUBLICATIONS

PCT International Search Report and Written Opinion in International Application No. PCT/US2020/042866, dated Sep. 23, 2020 17 pages.

* cited by examiner

*Primary Examiner* — Deeprose Subedi
(74) *Attorney, Agent, or Firm* — Fish & Richardson P.C.

(57) ABSTRACT

A system includes a microcontroller configured to: (a) receive, from an application processor, data for display on an organic light emitting diode (OLED) display having one region with a first dynamic range and another region having a second dynamic range; and (b) arrange the data into columns. A gamma generator is electrically connected to the microcontroller and generates first and second gammas specific to the different regions. A column driver is configured to: (a) apply the first gamma to each column to be displayed in the corresponding region to generate a first output, and apply the second gamma to each column to be displayed in the second region to generate a second output; and (b) electrically transmit the first and second outputs to the corresponding regions.

19 Claims, 5 Drawing Sheets

OLED DISPLAY WITH DIFFERENT SPATIAL GAMMA

TECHNICAL FIELD

The subject matter described herein relates to an organic light emitting diode (OLED) display having multiple different gammas for different Display Brightness Values (DBV) at different spatial regions of the OLED display.

BACKGROUND

In an organic light emitting diode (OLED) display, there is often a desire and a need to display content in different regions of the display with significant different brightness that are in different DBV band. For example, a graphical user interface may need to display the prominent content (e.g., a high dynamic range (HDR) video or image selected or currently being played, and/or other videos or images that can be selected or played later) with a higher brightness than less prominent content (e.g., a standard dynamic range (SDR) text or an advertisement) and data displayed above one or more sensors underneath the OLED display. Conventionally, however, the entire OLED display screen is controlled by a single gamma, which may be for variable display brightness value. Such single gamma across the entire OLED display may undesirably apply to other contents with improper display brightness value band across the entire OLED display, thereby distorts the gamma for the content in those DBV bands.

SUMMARY

An organic light emitting diode (OLED) display is described that has different gammas for different display brightness values in different spatial regions of the display.

In general, in one aspect, the disclosure features a system including a microcontroller configured to: (a) receive, from an application processor, data to be displayed on an organic light emitting diode (OLED) display having a first region having a first dynamic range and a second region having a second dynamic range different from the first dynamic range; and (b) arrange the data into multiple columns. The system also features a gamma generator electrically connected to the microcontroller, the gamma generator configured to generate a first gamma specific to the first region and a second gamma specific to the second region. The system further features a column driver configured to: (a) apply the first gamma to each column of the columns to be displayed in the first region to generate a first output, and apply the second gamma to each column of the columns to be displayed in the second region to generate a second output; and (b) electrically transmit the first output to the first region and the second output to the second region.

Embodiments of the system can include one or more of the following features. For example, the first dynamic range can be a high dynamic range (HDR), the second dynamic range can be a standard dynamic range (SDR), the first output can be a HDR output and the second output can be a SDR output.

The system can be a mobile device including the driver integrated circuit and the SDR region can be overlaid above one or more sensors of the mobile device configured to sense light transmitted through the SDR region.

The system can include a driver integrated circuit that includes the microcontroller, the gamma generator, and the column driver.

The data received by the microcontroller can include digital video data that is transmitted serially by the application processor.

The gamma generator can be configured to receive electrical power from a power source. The power source can include a power management integrated circuit.

The first gamma can be different from the second gamma.

The first gamma can be a first voltage represented on a first gamma curve; and the second gamma can be a second voltage represented on a second gamma curve, wherein the first gamma curve has a steeper slope than the second gamma curve.

The system can include a register to store addresses of the multiple columns.

The microcontroller can further configured to output timing data for display of the first output and the second output.

The system can include a gate clock generator configured to receive the timing data from the microcontroller, the gate clock generator generating gate clock signals based on the timing data to control timing of display of the first output and the second output.

In some embodiments, the system includes a multiplexer electrically connected to the gamma generator and the column driver, wherein the multiplexer is configured to select for each column one of the first gamma and the second gamma, the multiplexer selecting the first gamma when the column is to be displayed in the first region, the multiplexer selecting the second gamma when the column is to be displayed in the second region, the selection by the multiplexer to be applied to the column.

The microcontroller can be a timing controller.

In general, in another aspect, the disclosure features a method that includes: (a) receiving, by a driver integrated circuit (IC) and from an application processor, data to be displayed on an organic light emitting diode (OLED) display comprising a first region having a first dynamic range and a second region having a second dynamic range different from the first dynamic range; (b) arranging, by the driver IC, the data into a plurality of columns; (c) generating, by the driver IC, a first gamma specific to the first region and a second gamma specific to the second region; (d) applying, by the driver IC and for each column of the plurality of columns, the first gamma to the column when the column is to be displayed in the first region to generate a first output for the column, and the second gamma to the column when the column is to be displayed in the second region to generate a second output for the column; and (e) electrically transmitting, by the driver IC, the first output to the first region, and the second output to the second region.

Implementations of the method can include one or more of the following features. For example, the data to be displayed on the OLED display can be received by a microcontroller within the driver IC; and the data can be arranged into the plurality of columns by the microcontroller.

The first gamma and the second gamma can be generated by a gamma generator within the driver IC.

Applying of the first gamma and the second gamma can be performed by a column driver within the driver IC.

The OLED display can be an OLED display panel.

The first dynamic range can be a high dynamic range (HDR) and the second dynamic range can be a standard dynamic range (SDR).

The implementations described herein can have one or more advantages. For example, different regions of the OLED display can have different brightness values with proper gamma.

The details of one or more implementations are set forth below. Other features and advantages of the subject matter will be apparent from the detailed description, the accompanying drawings, and the claims.

DESCRIPTION OF DRAWINGS

Like reference symbols in the various drawings indicate like elements.

DETAILED DESCRIPTION

Figure 1:
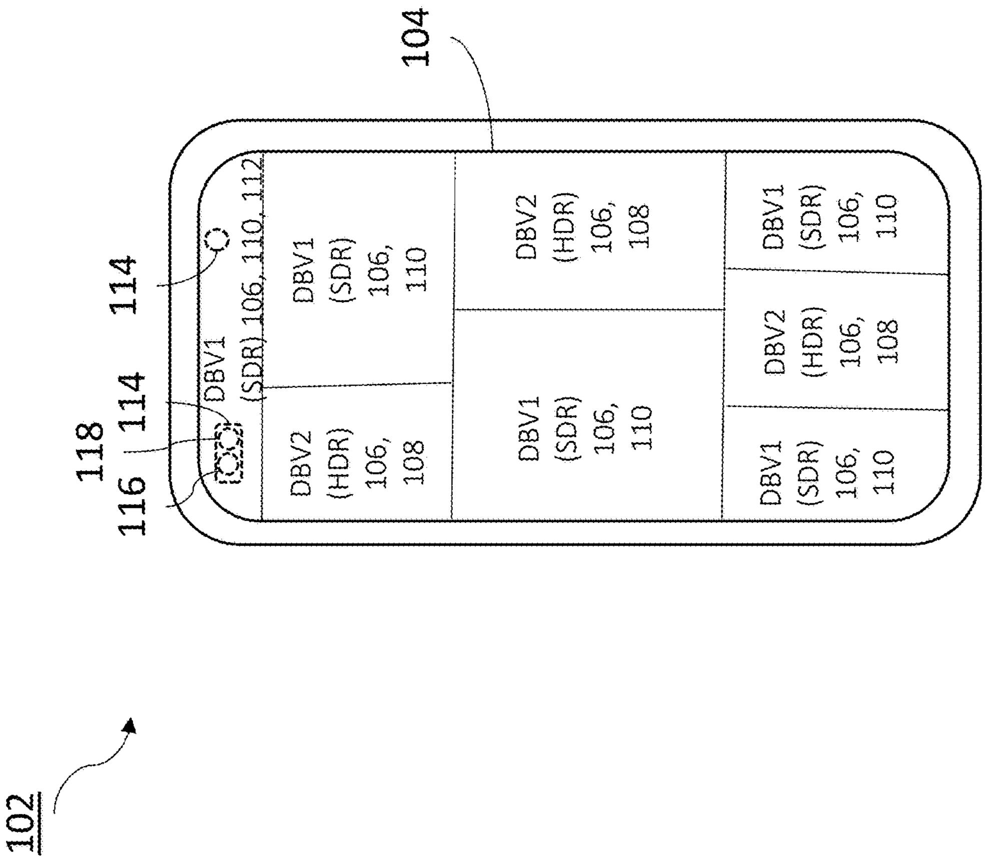
FIG. 1 illustrates a mobile device having an organic light emitting diode (OLED) display with regions requiring different maximum brightness levels, in accordance with some implementations of the current subject matter.

FIG. 1 illustrates an example computing device 102 having an organic light emitting diode (OLED) display 104 with regions (e.g., areas or spaces) 106 requiring different maximum brightness levels. The maximum brightness level is measured in terms of display brightness values (DBVs). In the shown example, each region 106 has a need for one of two maximum different brightness levels—DBV1 and DBV2. In general, regions 106 where high dynamic range (HDR) content has to be displayed have a higher maximum brightness value DBV2 than the maximum brightness value DBV1 for regions 106 where standard dynamic range (SDR) content has to be displayed. The region 106 of the OLED display 104 where HDR content displayed is referred to as a HDR region 108, and the region 106 of the OLED display 104 where SDR content displayed is referred to as a SDR region 110. Each of the HDR region 106 and the SDR region 110 can have separate gammas. The gamma of a region 108/110 indicates (e.g., identifies) the relationship between brightness of that region and the input voltage level for the OLED display 104. Generally, the gamma characterizes the relationship between the encoded luminance of the display and the desired luminance of an image. Mathematically, the gamma can refer to an exponent that scales an input value for the luminance of a pixel to the output value. Gamma values can, generally, be lower than 1 (e.g., 0.4-0.6) or higher than 1 (e.g., 1.5-3), depending on the desired relationship between the encoded luminance of the display and the desired luminance of the image.

The HDR content can have a dynamic range that is higher than that of the SDR content. Dynamic range indicates a ratio of the largest measurable value of luminance to a lowest measurable value of the luminance. The HDR content has a higher dynamic range than that of the SDR content, as the HDR content can have: (a) a higher largest measurable value of luminance than such largest measurable value of the SDR content, and (b) a lower lowest measurable value of luminance than such lowest measurable value of the SDR content. In some examples, the HDR content can have a dynamic range between 4000:1 and 25000:1, and the SDR content can have a dynamic range between 50:1 and 4000:1. In the displayed content, the bright objects are brighter in HDR than in SDR, the dark objects are darker in HDR than in SDR, and more details are displayed in HDR than in SDR.

The HDR region 108 can be one or more regions 106 where prominent content (e.g., a video or image selected or currently being played, and/or other videos or images that can be selected or played later) is displayed, and the SDR region 110 may include one or more regions 106 where less prominent content (e.g., an advertisement) is displayed, as described in further detail below by the example of FIG. 2. At least some portion 112 of the SDR region 110 can overlay and be electrically connected to one or more sensors 114. The sensors 114 can be configured to sense light transmitted through the SDR region 112. At least one sensor 114 can include a transmitter 116 and a receiver 118 (e.g., a 3D sensor for facial recognition).

The computing device 102 can be a mobile device, such as a phone, a tablet computer, a phablet computer, a laptop computer, a wearable device such as a smartwatch, a digital camera, any other one or more mobile device, and/or the like. In alternate implementations, the computing device 108 can be any other computing device such as a desktop computer, a kiosk computer, a television, and/or any other one or more computing devices.

The OLED display 104 can be driven with an active matrix display scheme, and can be referred to as an active matrix organic light emitting diode (AMOLED) panel. In an alternate implementation, the OLED display 104 can be driven with a passive matrix display, and can be referred to as a passive matrix organic light emitting diode (PMOLED) panel. The active matrix display scheme in the AMOLED panel can be advantageous over a passive matrix display scheme in the PMOLED panel, as AMOLED panels can provide higher refresh rates than PMOLED panels, and consume significantly less power than PMOLED panels.

While specific separate regions 106 are described, in alternate implementations the regions can occupy any other portions of the OLED display 104. The specific regions 106 can be formed and/or varied dynamically based on, for example, the application being accessed on the computing device 102, the physical orientation of the mobile device, user preferences, and/or the like. Varying of a region 106 can vary an area (e.g., space) occupied by that region 106. The need for any region 106 to have a certain level of brightness (and thus be classified as a HDR region 108 or a SDR region 110) can also vary dynamically, based on, for example, the application being accessed on the computing device 102, the physical orientation of the computing device 102, user preferences, and/or the like.

Generally, the maximum brightness of DBV1 and the maximum brightness of DBV2 are different, with maximum brightness of DBV1<maximum brightness of DBV2. For instance, maximum brightness of DBV2 can be 10% or more greater (e.g., 20% or more, 30% or more, 50% or more, 60% or more, 80% or more, 100% or more, or up to 200%) than maximum brightness of DBV1. In one example, the maximum display brightness value DBV1 can have a value of 400 nits (i.e., 400 candelas per square meter), and the maximum display brightness value DBV2 can have a value of 650 nits. In some examples, the maximum display brightness value DBV1 can have a value between 300 and 500 nits, and the maximum display brightness value DBV2 can have a value between 550 nits and 750 nits. In another example, the maximum display brightness value DBV1 can have a value between 200 and 525 nits, and the maximum display brightness value DBV2 can have a value between 525 nits and 850 nits. Further, while two display brightness values—DBV1 and DBV2—have been described, in alternate implementations any other number (e.g., three, four, five, six, seven, eight, nine, ten, eleven, twelve, or any other integer) of display brightness values can be present.

The sensors 114 can include one or more of: at least one accelerometer, at least one gyroscope, at least one magnetometer, at least one global positioning system (GPS), at least one proximity sensor, at least one ambient light sensor, at least one microphone, at least one touchscreen sensor, at least one fingerprint sensor, at least one pedometer, at least one sensor configured to sense machine readable representation of data such as barcode and/or quick response (QR) code, at least one barometer, at least one heart rate sensor, at least one thermometer, at least one air-humidity sensor, at least one radiation level sensor, and any other sensor.

Figure 2:
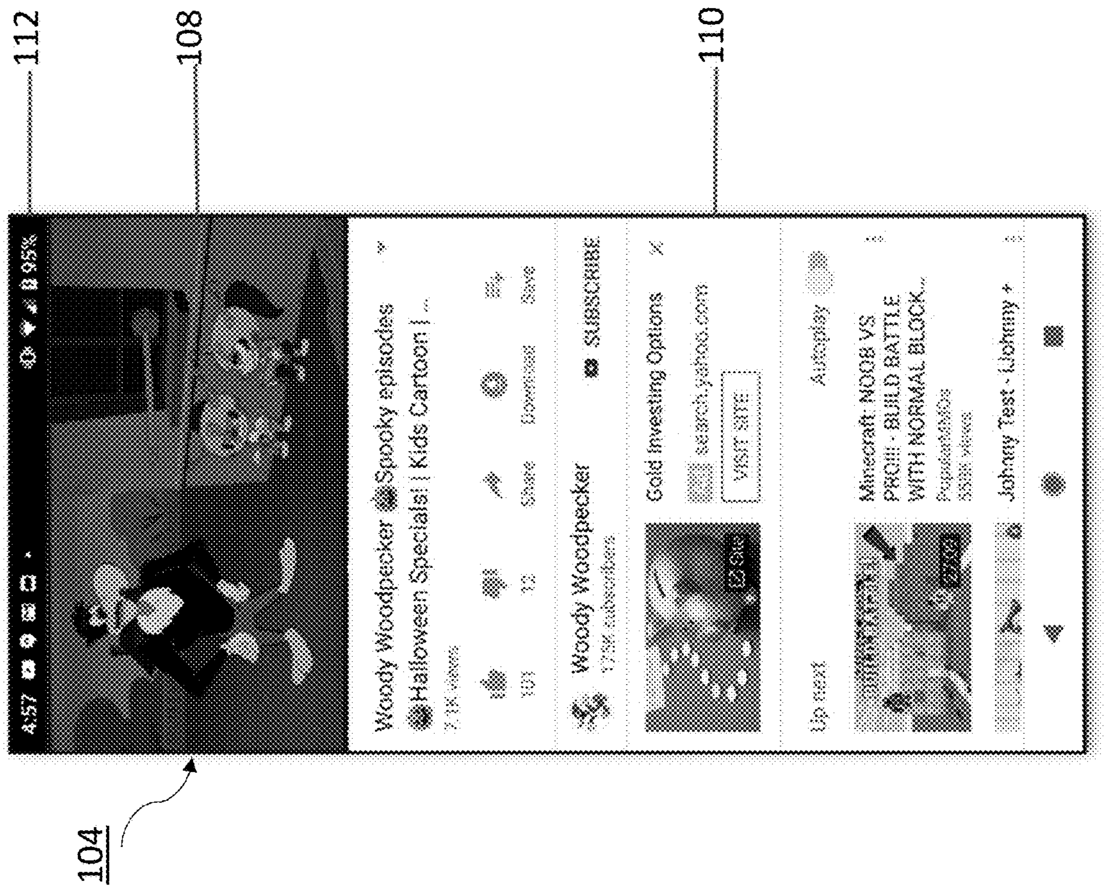
FIG. 2 illustrates another example of an OLED display having at least one high dynamic range (HDR) region and at least one standard dynamic range (SDR) region, in accordance with some implementations of the current subject matter.

FIG. 2 illustrates another example of the OLED display 104 having at least one HDR region 108 having a corresponding display brightness value DBV2 and at least one SDR region 110 having a corresponding brightness value DBV 1.

Figure 3:
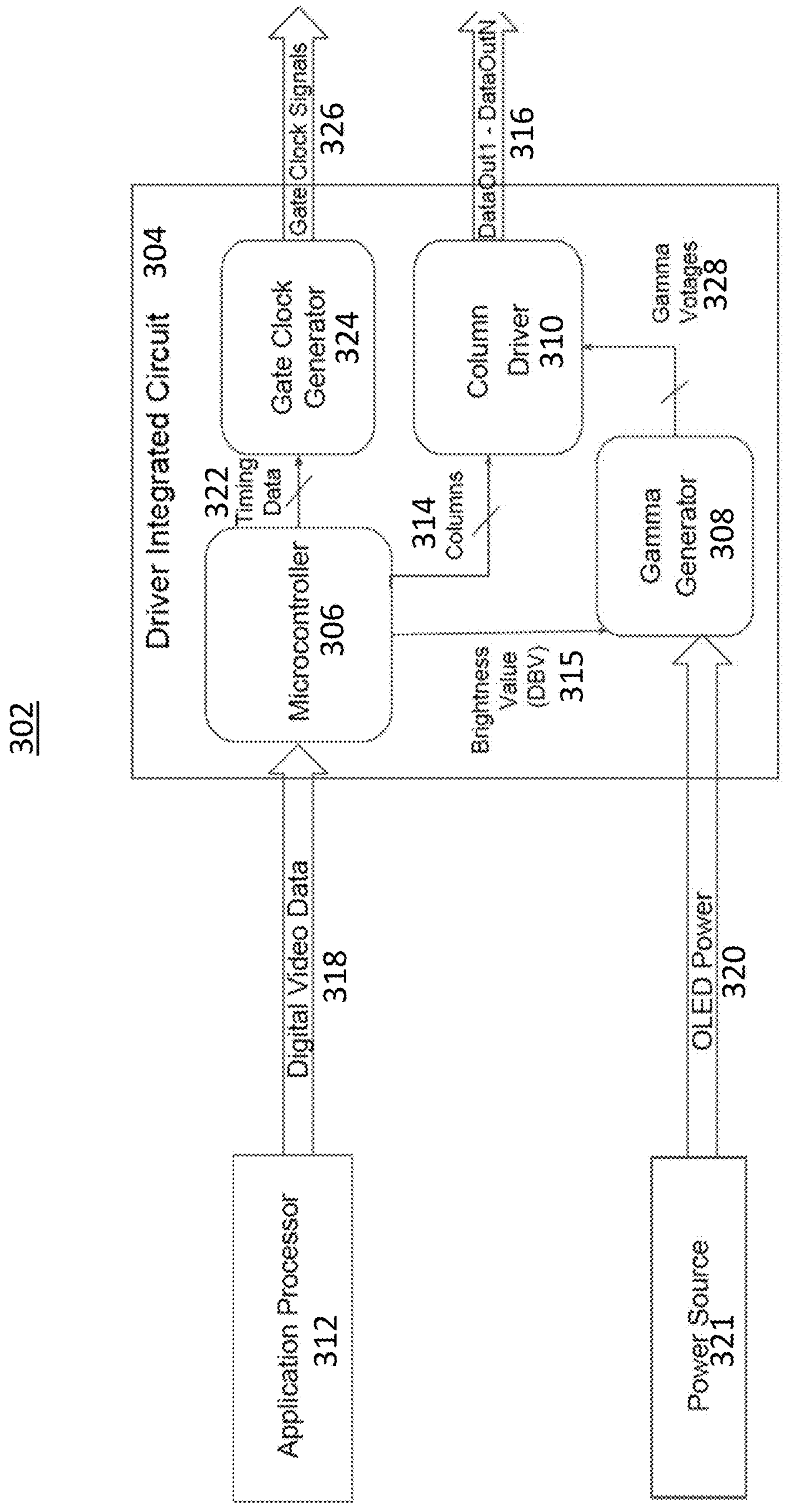
FIG. 3 illustrates a system that encodes content to be displayed in different regions of the OLED display with corresponding gammas, in accordance with some implementations of the current subject matter.

FIG. 3 illustrates a system 302 that encodes content to be displayed in different regions 106 of the OLED display 104 with corresponding gammas. The system 302 can be a driver integrated circuit (IC) 304 of the computing device 102. The driver IC 304 can include a microcontroller 306, a gamma generator 308, and a column driver 310. The microcontroller 306 can receive, from an application processor 312, data to be displayed on the OLED display 104 comprising a high dynamic range (HDR) region 108 and a standard dynamic range (SDR) region 110. The microcontroller 306 can arrange the data into a plurality of columns 314. The gamma generator 308 can be electrically connected to the microcontroller 306. The microcontroller 306 can transmit to the gamma generator 308 display brightness values 315.

The gamma generator 308 can generate, in response to the display brightness value DBV2 315, a first gamma specific to the HDR region 108. The gamma generator 308 can generate, in response to the display brightness value DBV1 315, a second gamma specific to the SDR region 110. The column driver 310 can apply the first gamma to each column of the plurality of columns 314 to be displayed in the HDR region 108 to generate a HDR output, and apply the second gamma to each column of the plurality of columns 314 to be displayed in the SDR region 110 to generate a SDR output. The HDR output and the SDR output can be part of the output DataOut1-DataOutN 316, which is further clarified by FIG. 4 (discussed below). The column driver 310 can electrically transmit the HDR output to the HDR region 108 and the SDR output to the SDR region 110.

The data received by the microcontroller 306 can include digital video data 318 that is transmitted serially by the application processor 312. The gamma generator 308 can receive electrical power 320 from a power source 321 and re-generate power needed for gamma generator 308. The power source 314 can include a power management integrated circuit. The first gamma can be different from the second gamma. The first gamma can be a first voltage represented on a first gamma curve, and the second gamma can be a second voltage represented on a second gamma curve. The first gamma curve can have a steeper slope than the second gamma curve.

The system 302 can further include a register to store addresses of the plurality of columns. The microcontroller 306 can output timing data 322 for display of the HDR output and the SDR output. The system 302 can further include a gate clock generator 324 configured to receive the timing data 322 from the microcontroller 306. The gate clock generator 324 can generate gate clock signals 326 based on the timing data 322 to control timing of display of the HDR output and the SDR output.

The system 302 can further include a multiplexer electrically connected to the gamma generator 308 and the column driver 310, as described below by FIG. 4. The multiplexer can be configured to select for each column 314 one of the first gamma and the second gamma. The multiplexer can select the first gamma when the column 314 is to be displayed in the HDR region 108, and can select the second gamma when the column 314 is to be displayed in the SDR region 110. The selection by the multiplexer can be applied to the column 314.

The driver integrated circuit (IC) 304 can be a semiconductor IC that provides an interface function between the microcontroller 306 and the OLED display 104. The microcontroller 306 can be a microprocessor, a controller, a microchip designed for a specific purpose such as an application-specific integrated circuit (ASIC), and/or the like. The microcontroller 306 can be a timing controller.

The gamma for a region, as described herein, indicates (e.g., identifies) the relationship between brightness of that region of the OLED display 104 and the input voltage level for the OLED display 104. The higher the gamma, the darker and higher contrast the image displayed in that region of the OLED display 104 has. The gamma is measured in terms of gamma voltages 328. The gamma generator 308 can be a gamma voltage generator.

Each pixel in the OLED display 104 can be made up of one red column 314, one green column 314 and one blue column 314. A color display screen with N×M pixels has N red columns 314, N green columns 314, and N blue columns 314 for a total of 3N columns 314, and therefore the column driver 310 may need to drive 3N columns 314. Some OLED displays share column with red and blue color while has separate green column, which is often called as pentile architecture. At this case the column driver 310 may need to drive 2N columns 314. Other application can use 1:K mux on the OLED panel. At this case the number of column will be 3N/K for normal RGB panel or 2N/K for pentile panel.

The application processor 312 can be a mobile application processor that can provide a self-contained operating environment that delivers all system capabilities needed to support the applications supported on the mobile device 102, such as memory management application, graphics processing application, and multimedia decoding application.

The digital video data 318 can be series of digital images displayed in succession. The power source 321 can be a power supply, which is an electrical device that can convert electrical current from a source to the appropriate voltage, current, and frequency needed to power the driver IC 304.

The timing data 322 can include one or more gate clock signals 326, each of which can be a particular type of signal that oscillates between a high and a low state and is used to coordinate and synchronize operations of the OLED display 104. The gate clock signals 326 can be generated by the gate clock generator 324. The clock generator 324 can be an electronic oscillator circuit.

Figure 4:
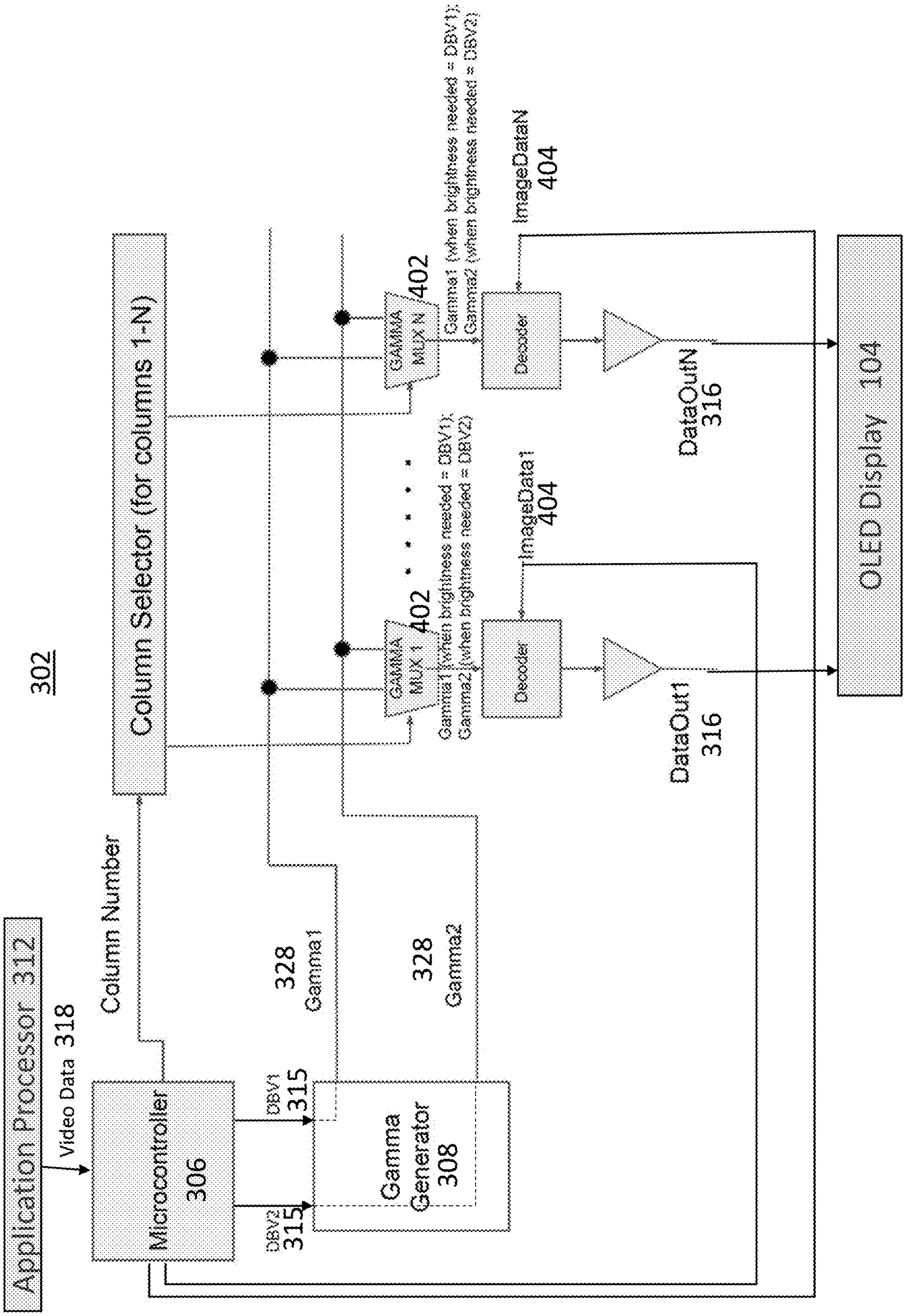
FIG. 4 illustrates further structure and functionality of a driver integrated circuit (IC) within the system of FIG. 3, in accordance with some implementations of the current subject matter.

FIG. 4 illustrates further structure and functionality of the driver IC 304 within the system of FIG. 3. The driver IC 304 can further include a multiplexer 402 electrically connected to the gamma generator 308 and the column driver 310. The multiplexer 402 can select, for each column 314, one of the first gamma and the second gamma. The multiplexer 402 can select the first gamma when the column 314 is to be displayed in the HDR region 108, and can select the second gamma when the column 314 is to be displayed in the SDR region 110. The gamma selection by the multiplexer 402 can be applied to the image data 404 associated with the column 314 to generate the output 316. The OLED display 104 can display the output 316 at times in accordance with the gate clock signals 326.

While two maximum display brightness values—DBV1 associated with the second gamma, and DBV2 associated with the first gamma—have been described, in alternate implementations any other number of maximum display brightness values can be present. When "n" number of maximum brightness regions are desired (where "n" can be any integer that has a value of two or more, e.g., three or more, four or more, five or more, such as up to 10), the gamma generator 308 can generate "n" gamma values, one of which can be selected by each multiplexer 402 based on desired brightness at a column 314 associated with the multiplexer 402. Moreover, displays can have more than two different regions (e.g., three or more, four or more, five or more, such as up to 10), each having a different associated gamma.

Figure 5:
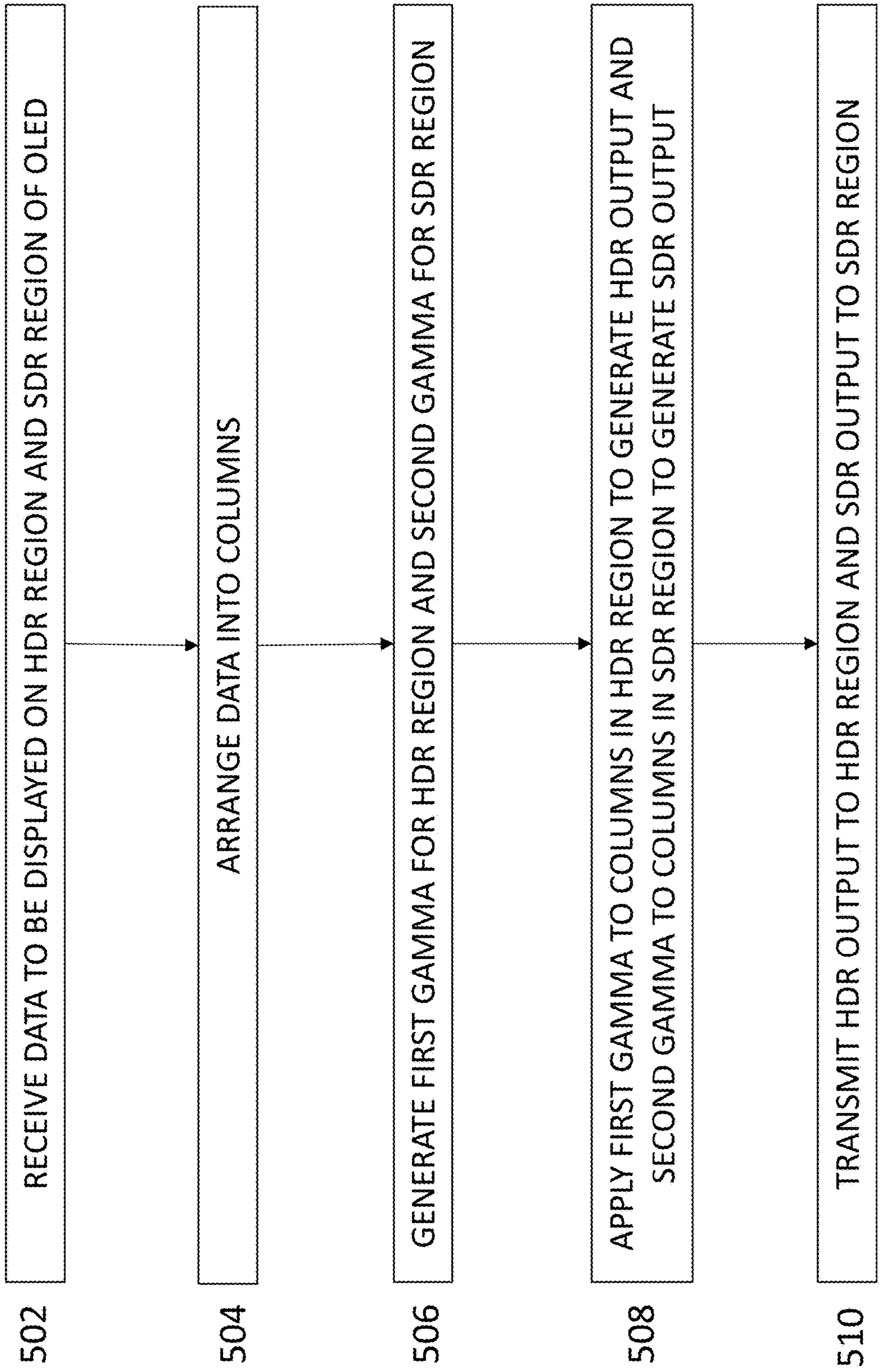
FIG. 5 illustrates a process performed by the driver IC, in accordance with some implementations of the current subject matter.

FIG. 5 illustrates a process performed by the driver IC 304 of FIGS. 4 and 5. The driver IC 304 can receive, at 502 and from an application processor 312, data to be displayed on the OLED display 104 that can include a HDR region 108 and a SDR region 110. The driver IC 304 can arrange, at 504, the data into a plurality of columns 314. The driver IC can generate, at 506, a first gamma specific to the HDR region 108 and a second gamma specific to the SDR region 110. The driver IC 304 can apply, at 508 and for each column of the plurality of columns 314, the first gamma to the column when the column is to be displayed in the HDR region 108 to generate a HDR output for the column, and the second gamma to the column when the column is to be displayed in the SDR region to generate a SDR output for the column. The driver IC 304 can electrically transmit, at 510, the HDR output to the HDR region 108, and the SDR output to the SDR region 110.

The data to be displayed on the OLED display 104 can be received by a microcontroller 306 within the driver IC. The data can be arranged into the plurality of columns 314 by the microcontroller 306. The first gamma and the second gamma can be generated by a gamma generator 308 within the driver IC 304. The applying of the first gamma and the second gamma can be performed by a column driver 310 within the driver IC 304.

Various implementations of the subject matter described herein can be implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the OLED display 104 can display data to a user. The sensors 114 can receive data from the one or more users and/or the ambient environment. The computing device 102 can thus operate based on user or other feedback, which can include sensory feedback, such as visual feedback, auditory feedback, tactile feedback, and any other feedback. To provide for interaction with the user, other devices can also be provided, such as a keyboard, a mouse, a trackball, a joystick, and/or any other device. The input from the user can be received in any form, such as acoustic input, speech input, tactile input, or any other input.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory (e.g., register) coupled to the one or more data processors. The memory may temporarily or permanently store instructions that cause at least one processor to perform one or more of the operations described herein. In addition, methods can be implemented by one or more data processors either within a single computing system or distributed among two or more computing systems.

Although various implementations have been described above in detail, other modifications can be possible. For example, the logic flows described herein may not require the particular sequential order described to achieve desirable results. Other implementations are within the scope of the following claims.

What is claimed is:

1. A system comprising:

a microcontroller configured to:

receive, from an application processor, data to be displayed on a display comprising a first region having a first dynamic range and a second region having a second dynamic range different from the first dynamic range; and arrange the data into a plurality of columns;

a gamma generator electrically connected to the microcontroller, the gamma generator configured to generate a first gamma specific to the first region and a second gamma specific to the second region;

a plurality of multiplexors that are each electrically connected to the gamma generator and that each correspond to a column of the plurality of columns, each of the multiplexers selecting the first gamma when the respective column is to be displayed in the first region, each of the multiplexers selecting the second gamma when the respective column is to be displayed in the second region, the selections by the multiplexers to be applied to the respective columns; and a column driver electrically connected to both the microcontroller and the plurality of multiplexors configured to:

based on the selections for each of the plurality of columns made by the plurality of multiplexors, apply the first gamma to each column of the plurality of columns to be displayed in the first region to generate a first output, and apply the second gamma to each column of the plurality of columns to be displayed in the second region to generate a second output; and electrically transmit the first output to the first region and the second output to the second region.

2. The system of claim 1, wherein the first dynamic range is a high dynamic range (HDR), the second dynamic range is a standard dynamic range (SDR), the first output is a HDR output and the second output is a SDR output.

3. The system of claim 2, wherein the system is a mobile device comprising the microcontroller, the gamma generator, and the column driver, and the SDR region is overlaid above one or more sensors of the mobile device configured to sense light transmitted through the SDR region.

4. The system of claim 1, further comprising a driver integrated circuit that includes the microcontroller, the gamma generator, and the column driver.

5. The system of claim 1, wherein the data received by the microcontroller comprises digital video data that is transmitted serially by the application processor.

6. The system of claim 1, wherein the gamma generator is configured to receive electrical power from a power source.

7. The system of claim 6, wherein the power source comprises a power management integrated circuit.

8. The system of claim 1, wherein the first gamma is different from the second gamma.

9. The system of claim 1, wherein:

the first gamma is a first voltage represented on a first gamma curve; and the second gamma is a second voltage represented on a second gamma curve, wherein the first gamma curve has a steeper slope than the second gamma curve.

10. The system of claim 1, further comprising:

a register to store addresses of the plurality of columns.

11. The system of claim 1, wherein the microcontroller is further configured to output timing data for display of the first output and the second output.

12. The system of claim 11, further comprising:

a gate clock generator configured to receive the timing data from the microcontroller, the gate clock generator generating gate clock signals based on the timing data to control timing of display of the first output and the second output.

13. The system of claim 1, wherein the microcontroller is a timing controller.

14. The system of claim 1, wherein each of the plurality of columns corresponds to a column in the display.

15. The system of claim 1, wherein the display includes multiple columns of pixels, wherein each column of pixels corresponds to one of the plurality of columns.

16. A method comprising:

receiving, by a driver integrated circuit (IC) and from an application processor, data to be displayed on a display comprising a first region having a first dynamic range and a second region having a second dynamic range different from the first dynamic range, wherein the driver IC includes a gamma generator, a plurality of multiplexors that are each electrically connected to the gamma generator and that each correspond to a column of a plurality of columns, and a column driver electrically connected to the plurality of multiplexors;

arranging, by the driver IC, the data into the plurality of columns;

generating, by the gamma generator, a first gamma specific to the first region and a second gamma specific to the second region;

selecting, by the plurality of multiplexors that are each electrically connected to the gamma generator and for the respective column of the plurality of columns, one of the first gamma and the second gamma, each of the multiplexers selecting the first gamma when the respective column is to be displayed in the first region, each of the multiplexers selecting the second gamma when the respective column is to be displayed in the second region, the selections by the multiplexers to be applied to the respective columns;

applying, by a column driver and for each column of the plurality of columns, the first gamma to the column when the column is to be displayed in the first region to generate a first output for the column, and the second gamma to the column when the column is to be displayed in the second region to generate a second output for the column; and electrically transmitting, by the driver IC, the first output to the first region, and the second output to the second region.

17. The method of claim 16, wherein:

the data to be displayed on the display is received by a microcontroller within the driver IC; and the data is arranged into the plurality of columns by the microcontroller.

18. The method of claim 16, wherein the display is an organic light emitting diode display panel.

19. The method of claim 16, wherein the first dynamic range is a high dynamic range (HDR) and the second dynamic range is a standard dynamic range (SDR).

* * * * *